Figure 1:
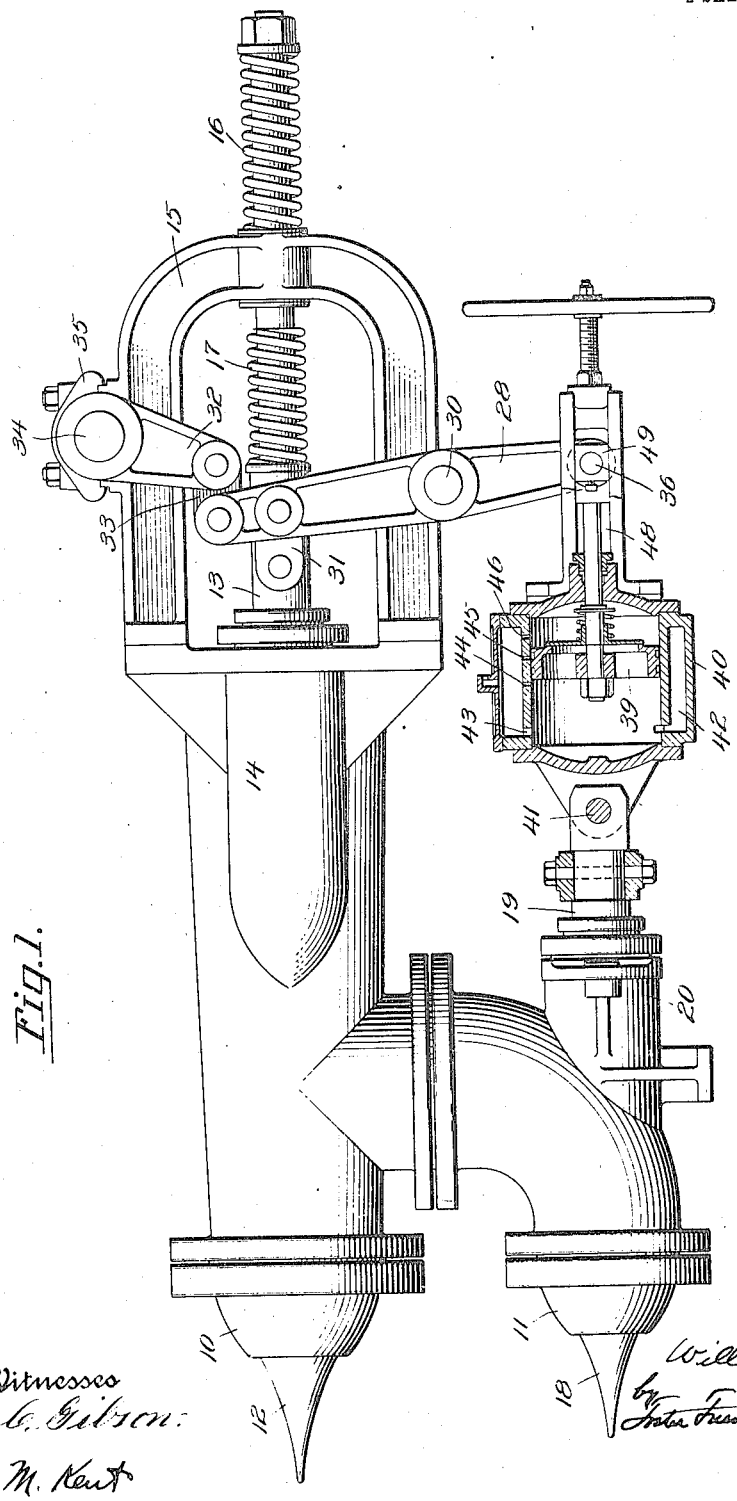

W. A. DOBLE.
CONTROL MECHANISM FOR AUXILIARY NOZZLES.
APPLICATION FILED JUNE 2, 1913.

1,123,860.

Patented Jan. 5, 1915.
2 SHEETS—SHEET 1.

Witnesses
F. C. Gibson
B. M. Kent

Inventor
William A. Doble
by Foster Freeman Watson Fort
Attorneys

W. A. DOBLE.
CONTROL MECHANISM FOR AUXILIARY NOZZLES.
APPLICATION FILED JUNE 2, 1913.
1,123,860.
Patented Jan. 5, 1915.
2 SHEETS—SHEET 2.
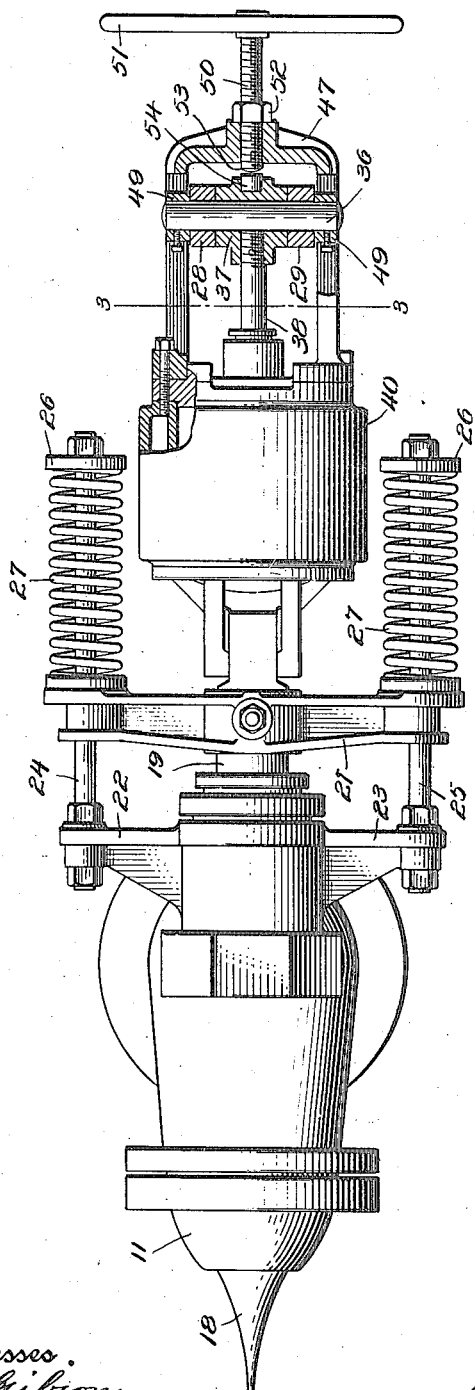
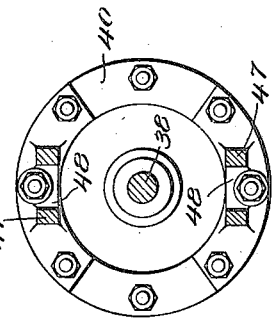
Witnesses
F. C. Gibson.
B. M. Kent.
Inventor
William A. Doble
by Foster Freeman Watson Coit
Attorneys

UNITED STATES PATENT OFFICE.

WILLIAM A. DOBLE, OF SAN FRANCISCO, CALIFORNIA, ASSIGNOR TO THE PELTON WATER WHEEL COMPANY, OF SAN FRANCISCO, CALIFORNIA, A CORPORATION OF CALIFORNIA.

CONTROL MECHANISM FOR AUXILIARY NOZZLES.

1,123,860.   Specification of Letters Patent.   Patented Jan. 5, 1915.

Application filed June 2, 1913. Serial No. 771,311.

*To all whom it may concern:*

Be it known that I, WILLIAM A. DOBLE, a citizen of the United States, residing at San Francisco, county of San Francisco, and State of California, have invented certain new and useful Improvements in Control Mechanism for Auxiliary Nozzles, of which the following is a specification.

This invention relates to control mechanism for water wheels and relates more specifically to means for controlling an auxiliary discharge nozzle, and is an improvement in the construction shown in my prior application No. 343,732, filed November 16, 1906.

Many power plants are so situated that it is frequently necessary to discharge a certain minimum quantity of water regardless of the quantity of water that is required to drive the water wheels and develop sufficient power to meet the demands on the station.

In the control mechanism covered by my prior application, above referred to, I employ a main nozzle and valve therefor to supply the water to the wheel, and an auxiliary nozzle and a valve therefor arranged to be opened and closed simultaneously with but in opposition to the movements of the main valve when the latter is moved suddenly by the governor, due to a change in the load on the wheel. The valves are connected together by means of suitable operating levers and links and a dash-pot is provided in one of the connections, the function of which is to permit the main valve to be moved gradually without moving the auxiliary valve and to cause the auxiliary valve to move simultaneously with the main valve whenever the latter is shifted suddenly. By this construction, whenever the main valve is suddenly closed the auxiliary valve will be opened but the pressure of the water on the auxiliary valve will gradually bring the latter to its seat and thereby cut off the discharge through the auxiliary nozzle. The above arrangement is thoroughly satisfactory where it is not necessary to discharge a certain minimum quantity of water regardless of the quantity of water required by the wheel and it has therefore been my object in devising the present construction to so improve the construction shown in my prior application above referred to that it will not only be suited to all installations in which the prior construction could be used, but is also adapted to be used in cases where it is necessary to discharge a certain minimum quantity of water.

I have illustrated a practical embodiment of my invention in the accompanying drawings, in which, Figure 1 is a side elevation of a main and auxiliary nozzle with the operating connections for the valves, the dash-pot being shown in section. Fig. 2 is a bottom plan view of Fig. 1, certain parts being shown in section. Fig. 3 is a transverse section on the line 3—3 of Fig. 2.

Referring to the drawings, 10 indicates the main nozzle and 11 the auxiliary nozzle. The main nozzle is preferably provided with a needle valve 12 having a stem 13 which passes through a stuffing box 14 and a yoke 15 secured to the nozzle body. Suitable buffer springs 16 and 17 are arranged on the stem 13 on opposite sides of the yoke 15. The nozzle 11 is preferably provided with a needle valve 18, having a stem 19 which passes through a stuffing box 20. A yoke 21 is secured on the stem 19 and extends laterally on both sides thereof. Brackets 22 and 23 are arranged on the side of the stuffing box 20 and have secured thereto the rods 24 and 25 respectively. These rods carry suitable abutments 26, between which and the yoke 21 springs 27 are arranged. By this construction the springs 27 will be compressed by opening the valve 18 and therefore the springs normally tend to close the valve whenever the latter is open.

The levers 28 and 29 are pivotally mounted at 30 on the yoke 15 or any other suitable support and have their upper ends connected with the valve stem 13 by means of links 31 and with the arm 32 by means of a link 33. The arm 32 is carried by a shaft 34 which is mounted in suitable bearings 35, supported in any suitable manner. The shaft 34 is connected with a governor (not shown) which is arranged to rock the shaft in accordance with changes in speed of the wheel and thereby shift the main and auxiliary valves. The lower ends of the levers 28 and 29 are connected with the cross head pin 36 carried in the cross head 37, to which is connected the piston rod 38, carrying the piston 39. The piston 39 is arranged in the dash-pot cylinder 40, which is connected with the valve stem 19 by means of the pivot 41. As described in my prior application, No. 343,732, the dash-pot cylinder 40 has an annular chamber 42 which communicates with the interior of the cylinder by means of suitable ports 43, 44, 45 and 46. The interior of the dash-pot cylinder on both sides of the piston 39 and the chamber 42 are filled with a fluid such as oil, which in the operation of the dash-pot passes from one side of the piston to the other through the ports above mentioned. A yoke 47 is secured to the dash-pot cylinder 40 and provided with guide slots 48 for the guide shoes 49, carried by the cross head pin 36. A screw 50 is arranged in the outer end of the yoke 47 and provided with a hand-wheel 51 and a lock-nut 52. The inner end 53 of the screw 50 is arranged to engage a suitable abutment 54, preferably carried by the cross head 37.

The operation of the mechanism is as follows: Assuming that the valve 18 is closed and the valve 12 is open to a certain extent, any slight variations in the load on the wheel will be provided for by the governor gradually shifting the valve 12 to increase or diminish the quantity of water delivered to the wheel in accordance with the requirements. When the valve 12 is shifted slowly by the governor, the piston 39 of the dash-pot will be moved in the dash-pot cylinder, the oil passing from one side of the piston to the other. If, however, the governor suddenly shifts the valve 12 toward the closed position, due to a sudden decrease in the load on the wheel, it will be seen that the piston 39 will be simultaneously moved toward the right (see Fig. 1). Owing to the restricted size of the port 46, the oil will not pass quickly from one side of the piston to the other and therefore the valve 18 will be opened simultaneously with the closing movement of the valve 12. The pressure of the water behind the valve 18, however, and the tension in the springs 27 will gradually move the valve 18 to its seat. As the valve 18 moves toward its seat it will be seen that the end 53 of the screw 50 will approach the abutment 54 on the cross head 37 and if the adjustment of the screw 50 is such that the end 53 will engage the abutment 54 before the valve 18 reaches its seat the latter will be held open to a certain extent and a certain minimum quantity of water will be discharged through the nozzle 11. When the valve 12 is fully closed it will be seen that the valve 18 may be opened by means of the hand-wheel 51 and the screw 50. While this construction provides for discharging a certain minimum quantity of water through the nozzle 11, it will be seen that the valve 12 will be permitted to have its full range of movement so that the operation of the main valve will not be interfered with.

I am aware that various changes may be made in the details of construction of the apparatus herein disclosed without departing from the spirit of my invention and I therefore claim such modifications as come within the scope of the appended claims

Having thus described my invention, what I claim is:

1. In an apparatus of the class described, the combination of a main valve, an auxiliary valve, means connecting said valves together and adapted to cause them to move simultaneously when the main valve is suddenly closed, and means for preventing the auxiliary valve from fully closing without limiting the normal range of movement of the main valve.

2. In an apparatus of the class described, the combination of a main valve, an auxiliary valve, means connecting said valves together and adapted to cause them to move simultaneously when the main valve is suddenly closed, and adjustable means for preventing the auxiliary valve from fully closing without limiting the normal range of movement of the main valve.

3. In an apparatus of the class described, the combination of a main valve, an auxiliary valve, means operatively connecting said valves together and including a dash-pot having the cylinder thereof connected with one of said valves and the piston thereof connected with the other of said valves, and means for limiting the relative movement of said piston and cylinder.

4. In an apparatus of the class described, the combination of a main nozzle and valve therefor, an auxiliary nozzle and valve therefor, means operatively connecting said valves together and including a dash-pot having the cylinder thereof connected with one of said valves and the piston thereof connected with the other of said valves, and adjustable means for limiting the relative movement of said piston and cylinder.

5. In an apparatus of the class described, the combination of a main nozzle and valve therefor, an auxiliary nozzle and valve therefor, a pivotally mounted lever, means connecting one arm of said lever with said main valve, a movable member connected with said auxiliary valve, a member yieldably connected with said auxiliary valve adapted to be moved by said lever, and means for limiting the relative movement of said members.

6. In an apparatus of the class described, the combination of a main nozzle and valve therefor, an auxiliary nozzle and valve therefor, a dash-pot cylinder operatively connected with one of said valves, a piston in said cylinder and operatively connected with the other of said valves, and an adjustable member coöperating with said cylinder and piston to limit the relative movement thereof.

7. In an apparatus of the class described, the combination of a main nozzle and valve therefor, an auxiliary nozzle and valve therefor, a pivotally mounted lever, means connecting one arm of said lever with said main valve, a dash-pot cylinder connected with said auxiliary valve, a piston in said cylinder connected with said lever, and an adjustable member carried by said cylinder and adapted to limit the movement of the piston therein.

8. In an apparatus of the class described, the combination of a main nozzle and valve therefor, an auxiliary nozzle and valve therefor, a pivotally mounted lever, means connecting one arm of said lever with said main valve, a dash-pot cylinder connected with said auxiliary valve, a spring tending to close said auxiliary valve, a piston in said cylinder and connected with said lever, and an adjustable screw adapted to limit the movement of said piston in said cylinder.

9. In an apparatus of the class described, the combination of a main nozzle and valve therefor, an auxiliary nozzle and valve therefor, a pivotally mounted lever, means connecting one arm of said lever with said main valve, a dash-pot cylinder connected with said auxiliary valve, a spring tending to close said auxiliary valve, a piston in said cylinder and connected with said lever, an adjustable screw adapted to limit the movement of said piston in said cylinder, and governor operatively connected with said lever.

In testimony whereof I affix my signature in presence of two witnesses.

WILLIAM A. DOBLE.

Witnesses:
   ARTHUR L. BRYANT,
   JOHN M. COIT.